United States Patent
Frait et al.

(10) Patent No.: US 9,878,706 B2
(45) Date of Patent: Jan. 30, 2018

(54) MODULAR HYBRID TRANSMISSION WITH TORQUE CONVERTER BAFFLE

(71) Applicant: FORD GLOBAL TECHNOLOGIES, LLC, Dearborn, MI (US)

(72) Inventors: Steven Anatole Frait, Milan, MI (US); John Edward Brevick, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 901 days.

(21) Appl. No.: 14/138,562

(22) Filed: Dec. 23, 2013

(65) Prior Publication Data

US 2015/0175154 A1 Jun. 25, 2015

(51) Int. Cl.
| | |
|---|---|
| B60K 6/00 | (2006.01) |
| B60W 20/40 | (2016.01) |
| B60K 6/405 | (2007.10) |
| B60W 10/02 | (2006.01) |
| B60W 10/06 | (2006.01) |
| B60W 10/08 | (2006.01) |

(52) U.S. Cl.
CPC .............. *B60W 20/40* (2013.01); *B60K 6/405* (2013.01); *B60W 10/02* (2013.01); *B60W 10/06* (2013.01); *B60W 10/08* (2013.01); *Y02T 10/6286* (2013.01); *Y10S 903/902* (2013.01); *Y10T 477/26* (2015.01)

(58) Field of Classification Search
CPC ...... B60W 20/40; B60W 10/02; B60W 10/06; B60W 10/08; B60K 6/405
USPC .................................. 74/665 A, 606 R, 661
See application file for complete search history.

(56) References Cited

U.S. PATENT DOCUMENTS

| | | | | | |
|---|---|---|---|---|---|
| 2,680,954 | A | * | 6/1954 | Churchill | F16H 41/30 60/337 |
| 3,049,945 | A | * | 8/1962 | Lindsay | F16H 47/10 475/144 |
| 3,277,746 | A | * | 10/1966 | Forster | F16H 47/08 184/61 |
| 5,103,127 | A | * | 4/1992 | Peter | B60K 6/40 123/179.1 |
| 6,184,603 | B1 | * | 2/2001 | Hamai | B60K 6/26 180/65.22 |
| 6,258,001 | B1 | * | 7/2001 | Wakuta | B60K 6/26 192/3.28 |
| 6,851,532 | B2 | | 2/2005 | Back et al. | |
| 7,000,747 | B2 | | 2/2006 | Back et al. | |
| 8,013,483 | B2 | | 9/2011 | Suzuki et al. | |
| 8,169,110 | B2 | | 5/2012 | Swales et al. | |
| 8,297,141 | B2 | | 10/2012 | Cimatti et al. | |
| 8,327,978 | B2 | * | 12/2012 | Ide | B63H 20/14 184/6.12 |
| 8,512,887 | B2 | | 8/2013 | Reyburn et al. | |
| 2011/0240384 | A1 | | 10/2011 | Roske et al. | |
| 2013/0087225 | A1 | | 4/2013 | Frait et al. | |

(Continued)

FOREIGN PATENT DOCUMENTS

JP 2000-179644 * 6/2000

*Primary Examiner* — William C Joyce
(74) *Attorney, Agent, or Firm* — Carlson, Gaskey & Olds

(57) ABSTRACT

An assembly includes, among other things, a front module housing an electric machine and an engine disconnect clutch, a transmission aft of the front module, a torque converter axially between the front module and the transmission, and a baffle radially between the torque converter and the transmission.

17 Claims, 5 Drawing Sheets

(56) References Cited

U.S. PATENT DOCUMENTS

| | | | |
|---|---|---|---|
| 2013/0087425 A1 | 4/2013 | Frait et al. | |
| 2013/0088109 A1* | 4/2013 | Frait | H02K 7/006 |
| | | | 310/90 |
| 2013/0192949 A1 | 8/2013 | Frait et al. | |
| 2013/0288853 A1* | 10/2013 | Miyazaki | B60K 6/48 |
| | | | 477/5 |

* cited by examiner

US 9,878,706 B2

MODULAR HYBRID TRANSMISSION WITH TORQUE CONVERTER BAFFLE

TECHNICAL FIELD

This disclosure relates to a hybrid electric vehicle, and more particularly, but not exclusively, to a baffle for a modular hybrid transmission.

BACKGROUND

Hybrid electric vehicles (HEV's) employ both an internal combustion engine and an electric machine that can be used either individually or in combination to propel the vehicle. A variety of different powertrains may be utilized by HEV's. One type of powertrain is referred to as a parallel configuration in which the engine is connected to the electric machine by a disconnect clutch and the electric machine drives a torque converter input of a transmission. The transmission has an output connected to a differential that is coupled to the drive wheels of the vehicle.

It may be desirable to position some components of the powertrain, such as the disconnect clutch, within a wet environment of the transmission. However, it can be difficult to drain lubricant from the disconnect clutch back to the transmission. Accordingly, additional advancements in this field of technology are desired.

SUMMARY

An assembly according to an exemplary aspect of the present disclosure includes, among other things, a front module housing an electric machine and an engine disconnect clutch, a transmission aft of the front module, a torque converter axially between the front module and the transmission, and a baffle radially between the torque converter and the transmission.

In a further non-limiting embodiment of the foregoing assembly, the baffle is radially between a torque converter housing of the torque converter and a transmission housing of the transmission.

In a further non-limiting embodiment of either of the foregoing assemblies, the baffle divides a space between a bottom center position of a torque converter housing and a transmission housing into a wet side and a dry side.

In a further non-limiting embodiment of any of the foregoing assemblies, the front module, the torque converter and the transmission are part of a modular hybrid transmission.

In a further non-limiting embodiment of any of the foregoing assemblies, the baffle includes a first sidewall and a second sidewall that extend from a floor.

In a further non-limiting embodiment of any of the foregoing assemblies, the floor is a curved floor and at least one of the first sidewall and the second sidewall includes a non-planar portion.

In a further non-limiting embodiment of any of the foregoing assemblies, at least one of the first sidewall and the second sidewall includes a mounting plate configured to mount the baffle to one of the front module and the transmission.

In a further non-limiting embodiment of any of the foregoing assemblies, a scraper extends between the first sidewall and the second sidewall and a scraper window is disposed underneath the scraper.

In a further non-limiting embodiment of any of the foregoing assemblies, the baffle is nested about a bottom center position of a housing of the torque converter.

In a further non-limiting embodiment of any of the foregoing assemblies, a corner is at an interface between the front module and the transmission, the corner configured to define a lubricant passageway between the baffle and the transmission.

A hybrid electric vehicle according to another exemplary aspect of the present disclosure includes, among other things, a modular hybrid transmission assembly including a torque converter and a baffle that at least partially surrounds the torque converter.

In a further non-limiting embodiment of the foregoing hybrid electric vehicle, the baffle nests about a bottom center position of a housing of the torque converter.

In a further non-limiting embodiment of either of the foregoing hybrid electric vehicles, a housing is positioned radially outward of the torque converter. The baffle divides a space between the housing and the torque converter into a dry side and a wet side.

In a further non-limiting embodiment of any of the foregoing hybrid electric vehicles, the baffle includes a first sidewall and a second sidewall that extend from a floor.

In a further non-limiting embodiment of any of the foregoing hybrid electric vehicles, the first sidewall, the second sidewall and the floor establish a cavity configured to accommodate a portion of the torque converter.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a modular hybrid transmission assembly for use in hybrid electric vehicles. The modular hybrid transmission assembly includes a front module that houses an electric machine and a disconnect clutch. A torque converter is positioned axially between the front module and a transmission gearbox. A baffle is positioned radially between the torque converter and a housing in order to divide a cavity therebetween into a wet side and a dry side. Lubricant may be drained from the front module along the wet side of the baffle in order to avoid interfering with the operation of the torque converter. These and other features are discussed in greater detail herein.

Figure 1:
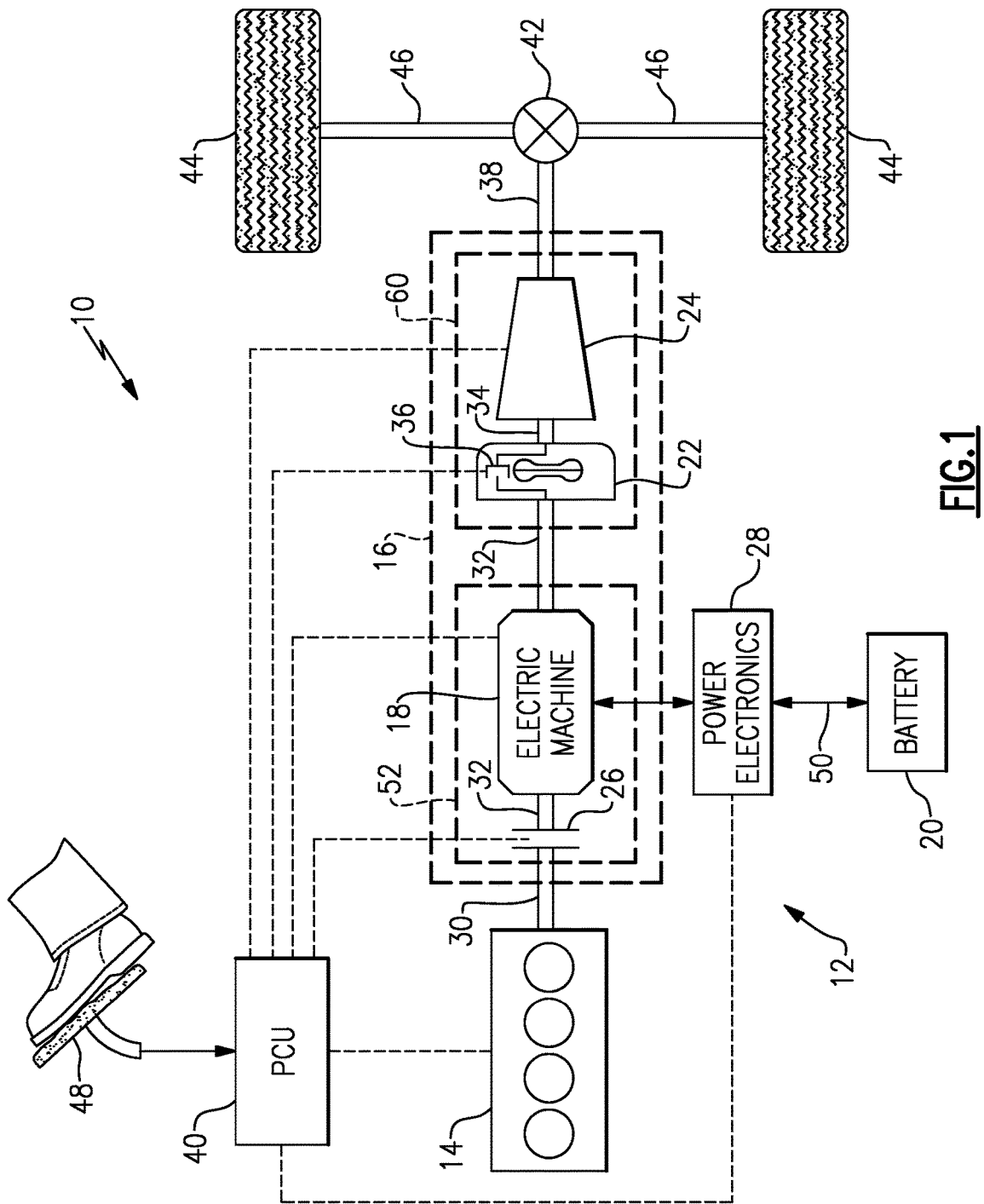
FIG. 1 schematically illustrates a powertrain of a hybrid electric vehicle.

FIG. 1 schematically illustrates a hybrid electric vehicle (HEV) 10. Although illustrated as a HEV, the present disclosure may be applicable to other types of electrified vehicles. In addition, although a specific component relationship is illustrated in FIG. 1, this illustration is not intended to limit this disclosure. In other words, it should be readily understood that the placement and orientation of the various components of the HEV 10 could vary within the scope of this disclosure.

The exemplary HEV 10 includes a powertrain 12. The powertrain 12 includes an engine 14 and a transmission 16 that is driven by the engine 14. In one embodiment, the transmission 16 is a modular hybrid transmission (MHT). The transmission 16 can include an electric machine 18 powered by a battery 20, a torque converter 22 and a multiple-step ratio automatic transmission, or gearbox 24. In one embodiment, the electric machine 18 is configured as an electric motor. The electric machine 18 could alternatively be configured as a generator or a combined motor/generator within the scope of this disclosure.

The engine 14 and the electric machine 18 may both be employed as available drive sources for the HEV 10. The engine 14 generally represents a power source that may include an internal combustion engine such as a gasoline, diesel, or natural gas powered engine, or a fuel cell. The engine 14 generates power and corresponding torque that is supplied to the electric machine 18 when an engine disconnect clutch 26 that is disposed between the engine 14 and the electric machine 18 is at least partially engaged.

The electric machine 18 may be implemented by any one of a plurality of types of electric machines. By way of one non-limiting embodiment, the electric machine 18 could be a permanent magnet synchronous motor.

Power electronics 28 are configured to condition direct current (DC) power provided by the battery 20 to the requirements of the electric machine 18, as is discussed more particularly below. For example, the power electronics 28 may provide three-phase alternating current (AC) to the electric machine 18.

When the engine disconnect clutch 26 is at least partially engaged, power flow from the engine 14 to the electric machine 18 or from the electric machine 18 to the engine 14 is possible. For example, the engine disconnect clutch 26 may be engaged and the electric machine 18 may operate as a generator to convert rotational energy provided by a crankshaft 30 and an electric machine shaft 32 into electrical energy to be stored in the battery 20. The engine disconnect clutch 26 can also be disengaged to isolate the engine 14 from the remainder of the powertrain 12 such that the electric machine 18 can act as the sole power source for propelling the HEV 10.

The electric machine shaft 32 may extend through the electric machine 18. The electric machine 18 is continuously drivably connected to the electric machine shaft 32, whereas the engine 14 is drivably connected to the electric machine shaft 32 only when the engine disconnect clutch 26 is at least partially engaged.

The electric machine 18 is connected to the torque converter 22 via the electric machine shaft 32. The torque converter 22 is therefore connected to the engine 14 when the engine disconnect clutch 26 is at least partially engaged. The torque converter 22 includes an impeller fixed to the electric machine shaft 32 and a turbine fixed to a transmission input shaft 34. The torque converter 22 thus provides a hydraulic coupling between the electric machine shaft 32 and the transmission input shaft 34.

The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 36 may also be provided. When engaged, the torque converter bypass clutch 36 frictionally or mechanically couples the impeller and the turbine of the torque converter 22 to enable a more efficient power transfer. The torque converter bypass clutch 36 may be operated as a launch clutch to provide smooth vehicle launch. Alternatively, or in combination, a launch clutch similar to the engine disconnect clutch 26 may be provided between the electric machine 18 and the transmission gearbox 24 for applications that do not include a torque converter 22 or a torque converter bypass clutch 36. In some embodiments, the engine disconnect clutch 26 is generally referred to as an upstream clutch and the torque converter bypass clutch 36 (which may be a launch clutch) is generally referred to as a downstream clutch.

The transmission gearbox 24 may include gear sets (not shown) that are selectively operated using different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 34. The transmission gearbox 24 may be automatically shifted from one ratio to another based on various vehicle and ambient operating conditions by an associated controller, such as a powertrain control unit (PCU) 40. The transmission gearbox 24 then provides powertrain output torque to the transmission output shaft 38.

It should be understood that the hydraulically controlled transmission gearbox 24 used with a torque converter 22 is but one non-limiting embodiment of a gearbox or transmission arrangement and that any multiple ratio gearbox that accepts input torque(s) from an engine and/or a motor and then provides torque to an output shaft at the different ratios is acceptable for use with the embodiments of this disclosure. For example, the transmission gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

The transmission output shaft 38 may be connected to a differential 42. The differential 42 drives a pair of wheels 44 via respective axles 46 that are connected to the differential 42. In one embodiment, the differential 42 transmits approximately equal torque to each wheel 44 while permitting slight speed differences such as when the vehicle turns a corner. Different types of differentials or similar devices may be used to distribute torque from the powertrain 12 to one or more wheels 44. In some applications, torque distribution may vary depending on the particular operating mode or condition, for example.

The powertrain 12 may additionally include an associated powertrain control unit (PCU) 40. While schematically illustrated as a single controller, the PCU 40 may be part of a larger control system and may be controlled by various other controllers throughout the HEV 10, such as a vehicle system controller (VSC). It should therefore be understood that the PCU 40 and one or more other controllers can collectively be referred to as a "controller" that controls various actuators in response to signals from various sensors to control functions such as starting/stopping engine 14, operating the electric machine 18 to provide wheel torque or charge the battery 20, select or schedule transmission shifts, etc. The PCU 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The PCU 40 may also communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

As schematically illustrated in FIG. 1, the PCU 40 may communicate signals to and/or from the engine 14, the engine disconnect clutch 26, the electric machine 18, the torque converter bypass clutch 36, the transmission gearbox 24, and the power electronics 28. Although not explicitly illustrated, those of ordinary skill in the art will recognize various functions or components that may be controlled by the PCU 40 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for engine disconnect clutch 26, torque converter bypass clutch 36, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 36 status (TCC), deceleration or shift mode, for example.

Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 48 may be used by the driver of the HEV 10 to provide a demanded torque, power, or drive command to propel the HEV 10. In general, depressing and releasing the pedal 48 generates an accelerator pedal position signal that may be interpreted by the PCU 40 as a demand for increased power or decreased power, respectively. Based at least upon input from the pedal 48, the PCU 40 commands torque from the engine 14 and/or the electric machine 18. The PCU 40 also controls the timing of gear shifts within the transmission gearbox 24, as well as engagement or disengagement of the engine disconnect clutch 26 and the torque converter bypass clutch 36. Like the engine disconnect clutch 26, the torque converter bypass clutch 36 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 36 may be operated as locked or open without using a modulated operating mode depending on the particular application.

To drive the HEV 10 with the engine 14, the engine disconnect clutch 26 is at least partially engaged to transfer at least a portion of the engine torque through the engine disconnect clutch 26 to the electric machine 18, and then from the electric machine 18 through the torque converter 22 and the transmission gearbox 24. The electric machine 18 may assist the engine 14 by providing additional power to turn the electric machine shaft 32. This operation mode may be referred to as a "hybrid mode" or an "electric assist mode."

To drive the HEV 10 using the electric machine 18 as the sole power source, the power flow remains the same except the engine disconnect clutch 26 isolates the engine 14 from the remainder of the powertrain 12. Combustion in the engine 14 may be disabled or otherwise turned OFF during this time to conserve fuel. The battery 20 transmits stored electrical energy through wiring 50 to the power electronics 28, which may include an inverter, for example. The power electronics 28 convert DC voltage from the battery 20 into AC voltage to be used by the electric machine 18. The PCU 40 commands the power electronics 28 to convert voltage from the battery 20 to an AC voltage provided to the electric machine 18 to provide positive or negative torque to the electric machine shaft 32. This operation mode may be referred to as an "electric only" or "EV" operation mode.

In any mode of operation, the electric machine 18 may act as a motor and provide a driving force for the powertrain 12. Alternatively, the electric machine 18 could act as a generator and convert kinetic energy from the HEV 10 into electric energy to be stored in the battery 20. The electric machine 18 may act as a generator while the engine 14 is providing propulsion power for the HEV 10, for example. The electric machine 18 may additionally act as a generator during times of regenerative braking in which rotational energy from spinning the wheels 44 is transferred back through the transmission gearbox 24 and is converted into electrical energy for storage in the battery 20.

It should be understood that highly schematic depiction of FIG. 1 is merely exemplary and is not intended to be limiting on this disclosure. Other configurations are additionally or alternatively contemplated that utilize selective engagement of both an engine and a motor to transmit through the transmission. For example, the electric machine 18 may be offset from the crankshaft 30 or an additional motor may be provided to start the engine 14. Other configurations are contemplated without departing from the scope of this disclosure.

Figure 2:
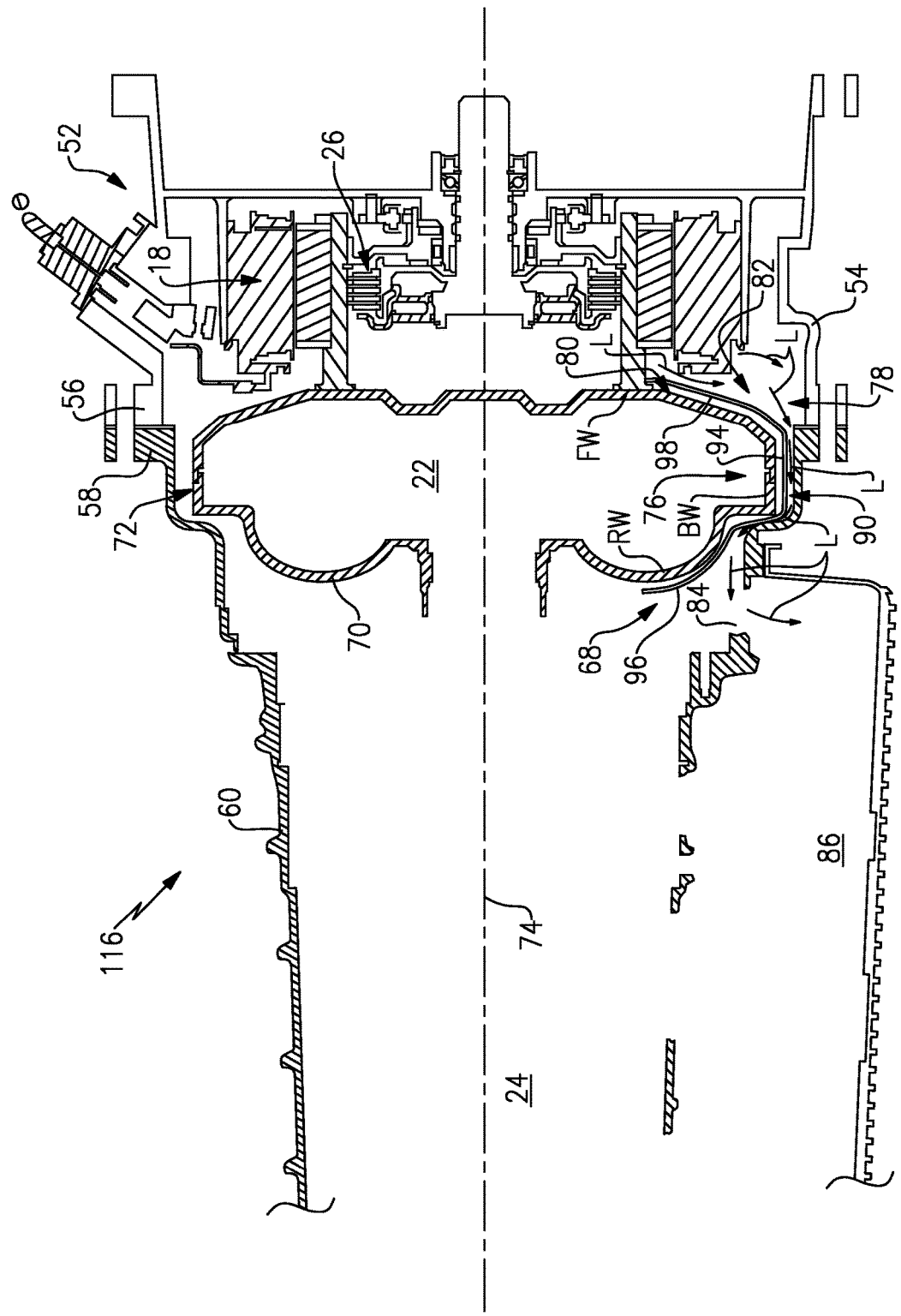
FIG. 2 illustrates a cross-sectional view of a modular hybrid transmission assembly.
Figure 3:
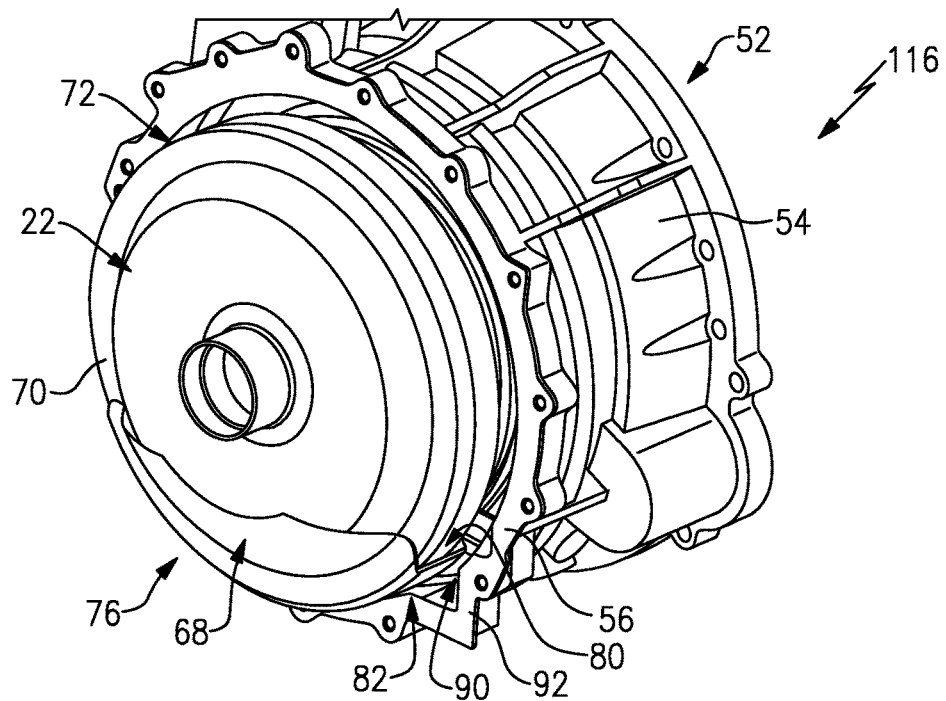
FIG. 3 illustrates an isometric view of a modular hybrid transmission assembly.

FIGS. 2 and 3 illustrate a modular hybrid transmission assembly 116 that may be employed within an electrified vehicle, such as the HEV 10 of FIG. 1. In this disclosure, like reference numbers designate like elements where appropriate and reference numerals with the addition of 100 or multiples thereof designate modified elements that are understood to incorporate the same features and benefits of the corresponding original elements.

The modular hybrid transmission assembly 116 includes a front module 52, a transmission gearbox 24 aft of the front module 52, and a torque converter axially between the front module 52 and the transmission gearbox 24. The front module 52 includes a housing 54 that substantially encloses an electric machine 18 and an engine disconnect clutch 26 (see FIG. 2). A transmission housing 60 (see FIG. 2, removed in FIG. 3 for clarity) substantially encloses the transmission gearbox 24 and at least partially encloses the torque converter 22. As shown in FIG. 2, the torque converter 22 may be partially housed by both the housing 54 and the transmission housing 60.

In one embodiment, the housing 54 of the front module 52 includes a mating flange 56 that mates with a corresponding mating flange 58 of the transmission housing 60. The mating flanges 56, 58 may mate along parallel, abutting faces, in one embodiment.

A baffle 68 may be positioned radially between the torque converter 22 and the transmission housing 60. The torque converter 22 includes a housing 70. In one embodiment, the baffle 68 is radially between the transmission housing 60 and the housing 70 of the torque converter 22.

The housing 70 defines a periphery 72 that extends about a longitudinal axis 74 of the modular hybrid transmission assembly 116. The periphery 72 has a bottom center position 76 that coincides with the six o'clock position of the housing 70. In one embodiment, the baffle 68 is generally nested about the bottom center position 76 of the housing 70 of the torque converter 22. In other words, the baffle 68 does not enclose the entire periphery 72 of the housing 70 of the torque converter 22.

In a first embodiment, the baffle 68 is mounted to the housing 54 of the front module 52 in order to divide the cavity 78 into the dry side 80 and the wet side 82 (see FIG. 2). In another embodiment, the baffle 68 is mounted to the transmission housing 60 (see FIG. 4). In yet another embodiment, the baffle 68 may be mounted to both the front module housing 54 and the transmission housing 60.

The baffle 68 divides a cavity 78 that extends between the transmission housing 60 and the housing 70 of the torque converter 22 between a dry side 80 and a wet side 82. The cavity 78 may also extend into the front module 52 as shown in FIG. 2. By dividing the cavity 78 in this manner, the engine disconnect clutch 26 may operate in a wet environment on the wet side 82 while maintaining the torque converter 22 out of the wet environment on the dry side 80.

For example, lubricant L may be used to lubricate and cool one or more components (e.g., the engine disconnect clutch 26, electric machine rotor, electric machine stator, etc.) housed in the front module 52. The lubricant L may be sourced from the transmission gearbox 24. By virtue of gravity, after it has done its work, this lubricant L may eventually accumulate in the cavity 78. The accumulated lubricant L needs to drain back to the transmission gearbox 24.

The baffle 68 establishes lubrication passageways 90 on the wet side 82 of the cavity 68 for draining the lubricant L. As best shown in FIG. 2, the lubricant L is communicated from the front module 52 downstream toward the transmission gearbox 24 on the wet side 82 of the baffle 68 and radially outward of the torque converter 22. Once around the torque converter 22, the lubricant L may pass through a drain back window 84 that leads into a sump 86 of the transmission gearbox 24. The lubricant L is thereby returned to the transmission gearbox 24 for reuse. Incorporation of the baffle 68 keeps the torque converter 22 from paddling through lubricant L as it drains back from the front module 52.

Figure 4:
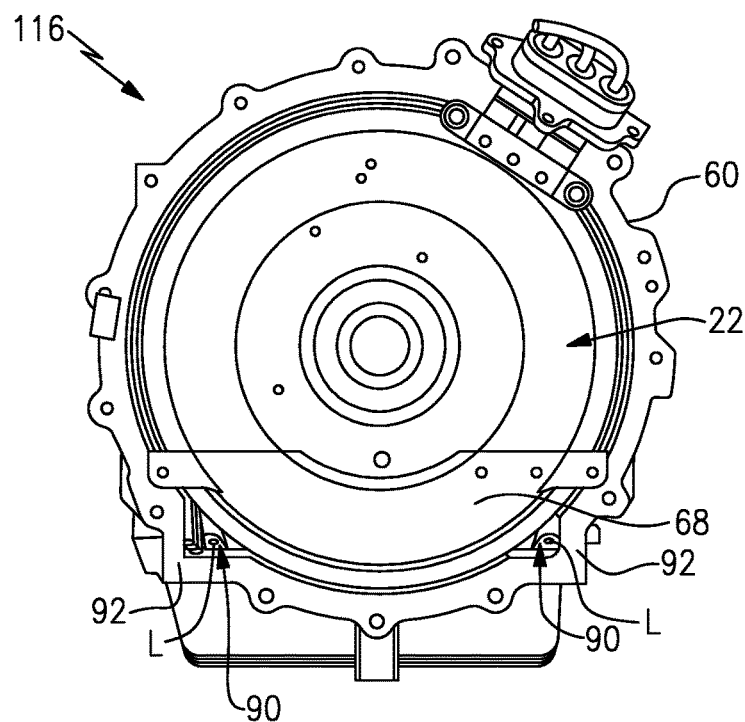
FIG. 4 illustrates another view of a modular hybrid transmission assembly.

Referring now to FIGS. 3 and 4, one or more corners 92 may be established at the interface between the front module housing 54 and the transmission housing 60. The corners 92 define the lubrication passageways 90 for draining the lubricant L around the baffle 68. The lubrication passageways 90 extend radially between the baffle 68 and the housings 54, 60. In this embodiment, the lubrication passageways 90 are generally triangular shaped. However, other shapes and sizes are contemplated as within the scope of this disclosure.

Figure 5A:
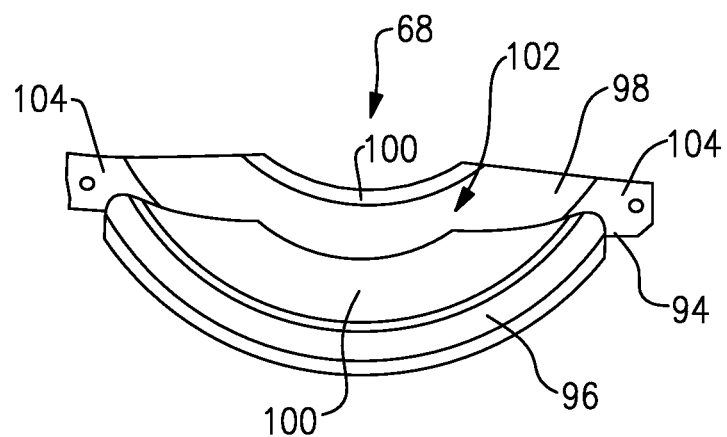
FIGS. 5A and 5B illustrate a baffle of a modular hybrid transmission assembly according to a first embodiment of the present disclosure.
Figure 5B:
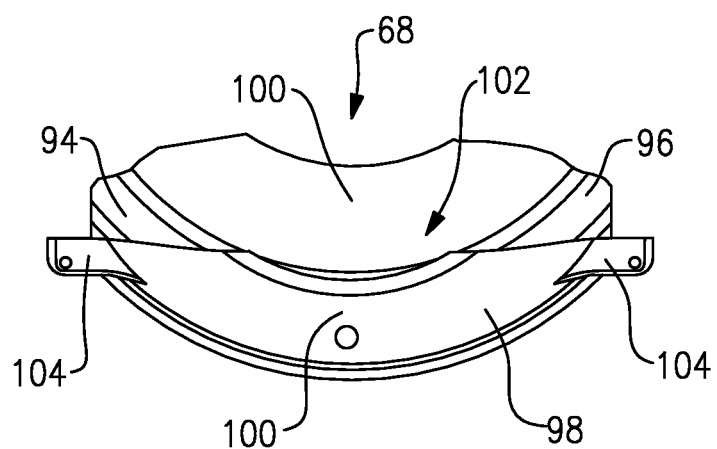

FIGS. 5A and 5B illustrate additional features of the baffle 68 illustrated in FIGS. 2, 3 and 4. In one non-limiting embodiment, the baffle 68 includes a floor 94 and sidewalls 96, 98 that extend transversely from the floor 94. The floor 94 and the sidewalls 96, 98 may be curved such that the baffle 68 defines a bathtub-like shape. In addition, one or both of the sidewalls 96, 98 may include a non-planar portion 100. In one embodiment, non-planar portions 100 of the sidewalls 96, 98 bow in a direction away from one another.

Together, the floor 94 and sidewalls 96, 98 establish a cavity 102 for accommodating the bottom portion of the torque converter 22. In this way, the baffle 68 nests about the torque converter 22 (see FIGS. 2 and 3). For example, as best shown in FIG. 2, the sidewall 96 nests about a rear wall RW of the torque converter housing 70, the sidewall 98 nests about a front wall FW of the torque converter housing 70, and the floor 94 nests about a bottom wall BW of the torque converter housing 70.

At least one of the sidewalls 96, 98 may include one or more mounting plates 104. The mounting plates 104 may be used to mount the baffle 68 to the modular hybrid transmission assembly 116, such as with one or more fasteners.

In one embodiment, the baffle 68 is made of a plastic material. One non-limiting example of a suitable plastic material is nylon. However, other materials are also contemplated as within the scope of this disclosure.

Figure 6A:
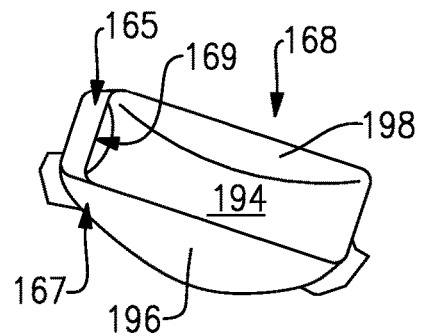
FIGS. 6A and 6B illustrate a baffle of a modular hybrid transmission assembly according to another embodiment of the present disclosure.
Figure 6B:
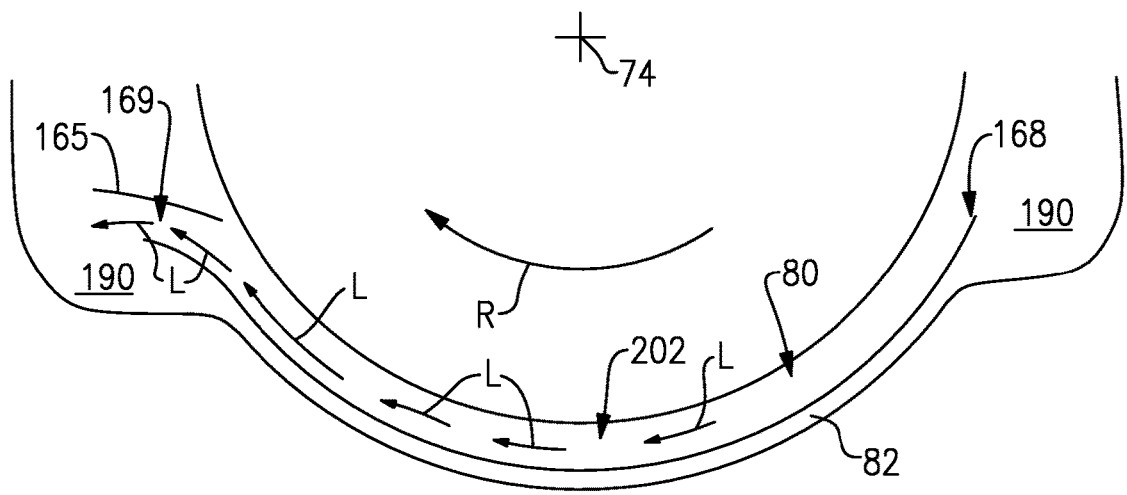

FIGS. 6A and 6B illustrate another exemplary baffle 168 that may be used within the modular hybrid transmission assembly 116 described above or some other transmission. FIG. 6A is an isometric view of the baffle 168, while FIG. 6B is a view looking fore to aft into the modular hybrid transmission assembly 116 (i.e., in a direction from the engine 14 toward the torque converter 22 as those components are shown in FIG. 1).

In some operating conditions, a relatively small amount of lubricant L may accumulate on the dry side 80 notwithstanding the use of the baffle 168. For example, this lubricant L may accumulate within a cavity 202 of the baffle 168. It may be desirable to remove the lubricant L from the cavity 202.

To that end, the baffle 168 may include a scraper feature 165. The scraper 165 extends between a first sidewall 196 and a second sidewall 198 of the baffle 168. The first and second sidewalls 196, 198 extend from a floor 194 of the baffle 168. In one embodiment, the scraper 165 is positioned at a trailing edge 167 of the baffle 168. However, the exact positioning of the scraper 165 could vary. A scraper window 169 extends through the floor 194 underneath the scraper 165.

Referring to FIG. 6B, as the torque converter housing 70 rotates about the longitudinal axis 74 in the direction R, lubricant L that has accumulated in the cavity 202 may be pumped toward the scraper window 169 by virtue of circumferential force created by the rotating the housing 70. The lubricant L communicated through the scraper window 169 is deflected by the scraper 165 (which when mounted is tangential to the housing 70) into a lubricant passageway 190 of the modular hybrid transmission assembly 116 for drainage back to the transmission gearbox (not shown in FIGS. 6A, 6B).

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An assembly, comprising:
   a front module housing an electric machine and an engine disconnect clutch;
   a transmission aft of said front module;
   a torque converter axially between said front module and a gearbox of said transmission; and
   a baffle radially between a torque converter housing of said torque converter and a transmission housing of said transmission, wherein a curved floor of said baffle nests about a bottom wall of said torque converter housing.

2. The assembly as recited in claim 1, wherein said baffle divides a space between a bottom center position of said torque converter housing and said transmission housing into a wet side and a dry side.

3. The assembly as recited in claim 1, wherein said front module, said torque converter and said transmission are part of a modular hybrid transmission.

4. The assembly as recited in claim 1, wherein said baffle includes a first sidewall and a second sidewall that extend from a floor.

5. The assembly as recited in claim 4, wherein said floor is a curved floor and at least one of said first sidewall and said second sidewall includes a non-planar portion.

6. The assembly as recited in claim 4, wherein at least one of said first sidewall and said second sidewall includes a mounting plate configured to mount said baffle to one of said front module and said transmission.

7. The assembly as recited in claim 1, wherein said baffle is nested about a bottom center position of said torque converter housing.

8. The assembly as recited in claim 1, comprising a corner at an interface between said front module and said transmission, said corner configured to define a lubricant passageway between said baffle and said transmission.

9. The assembly as recited in claim 1, wherein said baffle positions said engine disconnect clutch on a wet side of said assembly that is exposed to lubricant and positions said torque converter on a dry side of said assembly that is substantially void of said lubricant.

10. The assembly as recited in claim 1, wherein said torque converter is partially enclosed by both a housing of said front module and said transmission housing of said transmission.

11. The assembly as recited in claim 1, wherein said baffle includes a first sidewall nested about a rear wall of said torque converter and a second sidewall nested about a front wall of said torque converter.

12. The assembly as recited in claim 11, wherein said baffle includes a floor nested about a bottom wall of said torque converter.

13. An assembly, comprising:
    a front module housing an electric machine and an engine disconnect clutch;
    a transmission aft of said front module;
    a torque converter axially between said front module and said transmission;
    a baffle between said torque converter and said transmission, wherein said baffle includes a first sidewall and a second sidewall that extend from a floor; and
    a scraper that extends between said first sidewall and said second sidewall and a scraper window disposed underneath said scraper.

14. A hybrid electric vehicle, comprising:
    a modular hybrid transmission assembly including:
        a disconnect clutch;
        a torque converter;
        a baffle that at least partially surrounds said torque converter and positions said disconnect clutch on a wet side of said assembly that is exposed to lubricant and positions said torque converter on a dry side of said assembly that is substantially void of said lubricant; and
        a housing positioned radially outward of said torque converter, and wherein said baffle divides a space between said housing and said torque converter into said dry side and said wet side.

15. The hybrid electric vehicle as recited in claim 14, wherein said baffle nests about a bottom center position of a housing of said torque converter.

16. The hybrid electric vehicle as recited in claim 14, wherein said baffle includes a first sidewall and a second sidewall that extend from a floor.

17. The hybrid electric vehicle as recited in claim 16, wherein said first sidewall, said second sidewall and said floor establish a cavity configured to accommodate a portion of said torque converter.

* * * * *